March 24, 1931. G. H. SCHIEFERSTEIN 1,797,840
MEANS FOR THE TRANSMISSION OF POWER IN OSCILLATING FORM
Filed March 29, 1928
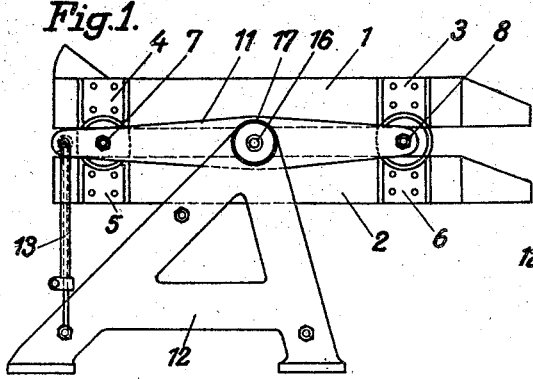
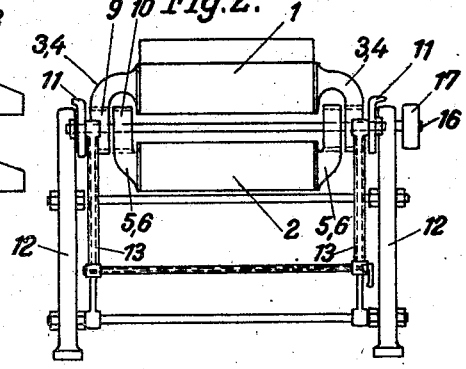
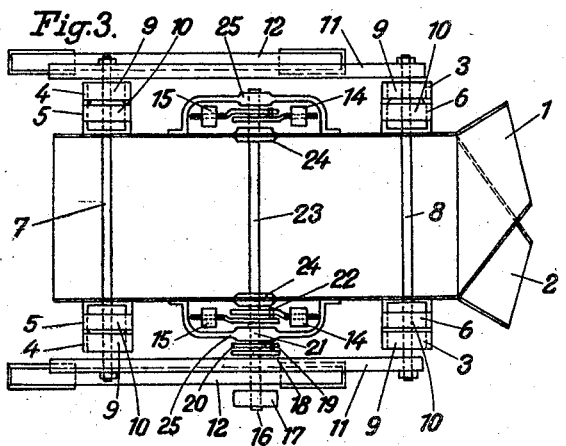
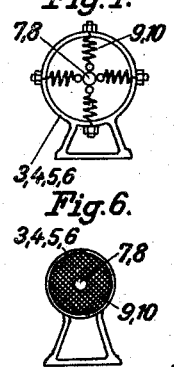
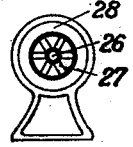
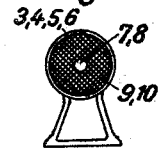
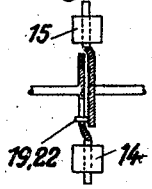
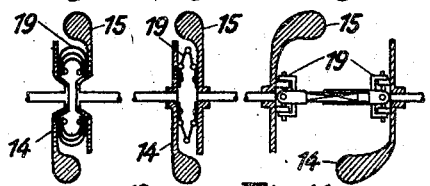
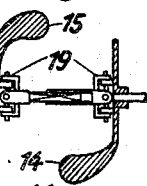
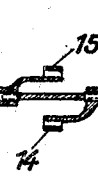
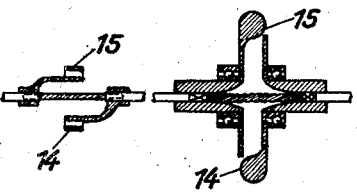
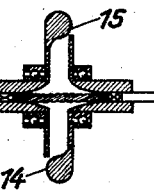
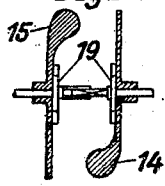
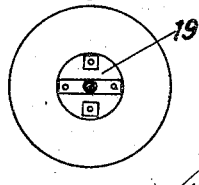
Inventor:
Georg Heinrich Schieferstein Patented Mar. 24, 1931                                                           1,797,840

UNITED STATES PATENT OFFICE

GEORG HEINRICH SCHIEFERSTEIN, OF BERLIN-CHARLOTTENBURG, GERMANY

MEANS FOR THE TRANSMISSION OF POWER IN OSCILLATING FORM

Application filed March 29, 1928, Serial No. 265,659, and in Germany April 8, 1927.

My invention relates to an improvement in means for the transmission of power in oscillating form. Such devices in which a driving or driven member is connected to an elastically constrained mass adapted to oscillate with pronounced natural frequency and variable amplitude in such a way as to impart energy to or to take energy from said oscillatory mass without substantially interfering with the natural frequency thereof, and in which the periodicity of the driving or driven member and the natural frequency of the oscillatory mass are substantially in tune, have been described and also a number of types of "loose coupling" adapted to transmit energy without disturbing the oscillation process.

The object of my present invention relates to an improvement of the above described device in the way, that the device becomes insensible to variation of frequency, insensible at overcharge and is balanced in respect to force and inertia effects.

In order more clearly to understand the invention, reference is made to the accompanying drawings which illustrate by way of example an embodiment thereof.

Figs. 1, 2, 3 denote a set of naturally oscillating loosely coupled systems in form of a screen-mechanism in several views, Figs. 4, 5, 6 denote examples of elastic bearings, Figs. 7–14 denote examples of energy transmitting loose coupling means.

In Figs. 1, 2, 3 two screens 1 and 2 are provided at both ends with bearings 3, 4, 5, 6, with shafts 7, 8 disposed concentrically in relation to each of said bearings and supported by the same at four points through elastic means 9, 10. Each of the two screens can describe oscillations independently of the other about their common supporting shafts 7 and 8, which oscillations may be circular if set up by suitable actuating means. Such means consist of a driving shaft 16, to one end of which is attached a pulley 17 and to the other one a flat disk 18 which is yieldingly connected by means of a catch-pin 19 with a similar plat disk 20, provided with a slot. The disk 20 is connected with the shaft 21, which on the other end is provided with an off-balance-member 15. The disk 20, the shaft 21 and the off-balance-member 15 represent an integral unit. The connection by catch-pin and slot is in such a way that the axes 16 and 21 can undergo relative displacement in revolving.

The off-balance-member 15 which may be a unit with an eccentrically attached up and down screwable weight is connected in the above described manner by pin 22 and slot with the off-balance-member 14, which in turn is attached to the shaft 23. The shaft 21 revolves in the bearings 25 attached to the screen 2 and the shaft 23 in the bearings 24 attached to the screen 1. The said off-balance members, effecting as loose couplings in the sense of the art of oscillation, and the two screens form an oscillatory set, which is held by the arms 11 which in turn are pivoted in bearings of the supports 12. The said set can be obliquely inclined and adjusted by the detent device 13.

When the herein-described device is set in action, then the following happens:

The shaft 16 revolves and generates, in the off-balance-members 14, 15, centrifugal forces which act upon the oscillatory units in unison with the number of revolutions. Since the off-balance-members are interconnected, by yielding means, in such a way that their eccentric masses are diametrically opposed, then, in the same instant that the mass 1 (upper screen) swings, the mass 2 (lower screen) will also swing, but in an 180° disposed phase, and vice versa, so that the action of force and mass of both units as well as that of the off-balance-members on the common support of the device are mutually balanced. The device Figs. 1, 2, 3 may therefore be regarded as an oscillatory set which is completely balanced as regards forces and inertia.

The device described produces circular oscillation, that is to say, depicts systems in which two oscillatory movements with a phase displacement of 90°, act simultaneously on each of the oscillatory units present. Hence, each point on the oscillatory unit describes an arcuate movement, or in the event of the amplitude in the one direction being arranged to be smaller than in the other direction, a movement along an elliptical curve.

Depending upon the kind of accumulating elastic means used the movement of the oscillating mass takes an harmonic or an pseudo-harmonic course. A pronounced resonance is to be observed when the said course is an harmonic one, whereas at an unharmonic or pseudo-harmonic course the resonance frequency varies within one oscillation as the amplitude varies. Therefrom results that by increasing the frequency of the device an increased amount of energy is transmitted. The increased energy presupposes an increased amplitude and the increased amplitude effects a higher point of resonance so that within broad limits the point of resonance leads before the exciting frequency and cannot be exceeded.

Therefrom it practically results, that the good working of the mechanism is not effected by variation of the number of revolutions of the driving means, so that the mechanism maintains a good efficiency at even a considerable variation of frequencies of the driving means. As a well adapted elastic means for the purpose mentioned was found homogeneous rubber bearings, the pseudo-harmonic effect of which may be broadly influenced by specially shaping it. The nature of the pseudo-harmonic effect avoids the possibility of damage occurred by overcharge of the pseudo-harmonic oscillating device, as the resistance of the elastic means increases with the increase of amplitude.

In Fig. 4 the elastic means consist of radially disposed springs 9, 10 with a shaft 7, 8 supported centrically.

Fig. 5 shows another kind of elastic bearing comprising, rollers 27 provided with rubber resp. pneumatic tyres 28.

Fig. 6 shows a bearing (3, 4, 5, 6) with homogeneous rubber (9, 10) supported by the axis 7, 8.

In both cases (Figs. 5 and 6) the bearing (3, 4, 5, 6) may be stationary and the axis (7, 8, 26) attached to the screens (1, 2) or vice versa. The rubber-elastic means may in working the device roll off on the curve-shaped, for instance, ring-shaped surface of the bearing.

Figs. 7–14 represent various embodiments of the coupling device, or the off-balance-members.

In Fig. 7 the disks on which the eccentric weights 14, 15 are adjustably disposed are connected yieldingly by the pin (19, 22) moving in the opposed slot of disk 15.

In Fig. 8 the yielding connecting members 19 which may consist of single strips of steel or leather, are disposed in a plurality of layers with suitable spacing means.

Fig. 9 represents an off-balance arrangement in which the flexible means 19 connecting the off-balance members is in the form of a hinge. In Fig. 10, the two off-balance members 14 and 15 are connected together by a double universal joint 19, constructed in such a way as to allow telescoping to be effected in known manner.

In Figs. 11 and 12 the connection between the two off-balance members 14 and 15 is effected by means of a flexible shaft, which is also adapted to telescope.

Finally Fig. 13 represents a section, and Fig. 14 a plan, of two off-balance members 14 and 15, which are coupled together by means of a leather disk and an extensible member 19. In this case also, the axes of the two off-balance members can be relatively displaced while transmitting a torque at the same time.

The embodiments herein described and illustrated are, of course, only given by way of example, and the invention is in no wise changed by arranging for two coupling members to engage two or more relatively displaceable points of application on the oscillatory unit or units, and thus cause them to oscillate whilst, by a due choice of dimensions or disposition of masses, said unit or units are so balanced that no vibration is transmitted to the common foundation.

Moreover, the kind of oscillatory movements is immaterial, whether the same proceeds along closed or open curves, or symmetrically or asymmetrically about a neutral point.

Claims:

1. In a device of the character described, in combination, driving means, at least one driven means, rubber mounting means for the driven means, bearings for said rubber mounting means, loose coupling means between the driving and driven means, and pivoted means in which said bearings are mounted, and means to adjust the inclination of said pivoted means.

2. In a device of the character described, in combination, driving means, driven means comprising a rubber supported mass, said rubber permitting oscillation of the mass, a loose coupling between the driving and driven means to permit the mass to effect variations of amplitude and transmit to the mass sufficient energy to compensate its damping during operation of the device without disturbing its free oscillation.

3. In a device of the class described in combination, driving means, driven means including a mass, shafts therefor and solid rubber bearings for the shafts permitting pseudo harmonic oscillation of the mass; a loose coupling between the driving and driven means permitting variations of amplitude of the mass with respect to the driving means and transmitting energy to said mass sufficient to overcome the damping of the mass during oscillation without disturbing its free oscillation.

4. In a device of the character described, two driven means, each including a mass and rubber mounting means therefor permitting oscillations of the mass at variable amplitudes, driving means common to said driven means, a loose coupling between the driving means and each driven means, and means to effect a phase difference of 180° between the two driven means.

5. In a device of the character described, two driven means each comprising a mass and rubber mounting means for each, to permit their oscillation at variable amplitudes, driving means common to both driven means, a loose coupling between each driven means and the driving means to transmit to the masses energy sufficient to compensate their damping during oscillation, and means on each coupling for maintaining a phase difference in the oscillations of said masses.

6. In a device of the class described, two driven means each comprising a mass and elastic means for mounting them for oscillation, a driving means common to both driven means, loose coupling between the driving means and each driven means, the driven means and coupling means substantially compensating each other with respect to power and mass action, and means to connect said coupling means yieldingly with the driven and driving means with respect to oscillation but with respect to the transfer of energy substantially rigid.

7. In a device of the character described in combination, driving shaft, two oscillating units, rubber supports for each unit to permit natural oscillation thereof, a loose coupling between each unit and said driving shaft, permitting radial movements of the units to the driving shaft, an adjustable weight on each member of a coupling, said weights disposed substantially diametrically opposite to equalize the forces of said units, said coupling means permitting yielding of the units as to oscillation but being substantially rigid as to torque.

8. In a device of the character described in combination, driving means, two oppositely oscillatable units, means to resiliently mount said units, a loose rotating coupling between each unit and the driving means, an adjustable weight on a member of each coupling, said weights being diametrically opposite, and said couplings yielding radially with respect to each other and with respect to the driving means for a portion of an oscillation of their respective units, whereby the couplings yield as to the oscillatory movements of the units but are substantially rigid as to torque.

9. In a device of the character described in combination, driving means, two oscillating units, bearing devices for the units, rubber bearings arranged to roll in said devices, a loose coupling for each unit connecting it with the driving means and each comprising two members, an adjustable weight on a member of each coupling, the weights being substantially diametrically arranged, said couplings yielding radially with respect to the oscillating units but being substantially rigid as to torque.

10. In a device of the character described, a frame, a driving shaft therein having a belt on one end, a coupling member on the other end, two oscillating units, a shaft alined with the driving shaft mounted on one of the units, a coupling member on one end of the latter shaft cooperating loosely with the aforesaid member to permit variation of oscillation of the unit on which the latter shaft is mounted, a second coupling unit on the other end of the shaft, a shaft mounted on the other unit, a coupling member thereon cooperating with the last mentioned member, an adjustable weight on each of the last two members, and means on the frame in which the units are elastically mounted.

11. In a device of the character described, a frame, a driving shaft therein having a belt pulley on one end, a coupling member on the other end, two oscillating units, a shaft alined with the driving shaft mounted on one of the units, a coupling member on one end of the latter shaft cooperating loosely with the aforesaid member to permit variation of oscillation of the unit on which the latter shaft is mounted, a second coupling unit on the other end of the shaft, a shaft mounted on the other unit, a coupling member thereon cooperating with the last mentioned member, an adjustable weight on each of the last two members, means on the frame in which the units are elastically mounted, and an adjusting device to vary the inclination of said means.

12. In a device of the character described in combination, a frame, a pair of spaced arms pivoted between their ends in the frame, means to hold the spaced arms in rigid positions on their pivot, two oppositely oscillatable units arranged between the arms, yielding bearings at the ends of said arms in which the units are mounted, a driving shaft in the frame having a pulley on one end and a coupling member on the other end, an alined shaft mounted on one unit, a coupling member on one end thereof, said members having a pin and slot connection, and an eccentrically weighted plate on the other end of the alined shaft mounted on the other unit, and an eccentrically weighted member thereon, said weighted members having a pin and slot connection with each other.

GEORG HEINRICH SCHIEFERSTEIN.